(12) United States Patent
Sanjay et al.

(10) Patent No.: US 9,026,362 B2
(45) Date of Patent: May 5, 2015

(54) POSITION CALCULATING METHOD AND POSITION CALCULATING DEVICE

(75) Inventors: Rama Sanjay, Karnataka (IN); Anand Kumar, Richmond (CA); Shunichi Mizuochi, Matsumoto (JP); Kenji Onda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/116,750

(22) PCT Filed: May 2, 2012

(86) PCT No.: PCT/JP2012/002967
§ 371 (c)(1),
(2), (4) Date: Feb. 10, 2014

(87) PCT Pub. No.: WO2012/153501
PCT Pub. Date: Nov. 15, 2012

(65) Prior Publication Data
US 2014/0214317 A1    Jul. 31, 2014

(30) Foreign Application Priority Data
May 10, 2011    (JP) .................................. 2011-105614

(51) Int. Cl.
*G01C 21/00*    (2006.01)
*G01S 19/05*    (2010.01)
*G01C 21/16*    (2006.01)
*G01S 19/47*    (2010.01)

(52) U.S. Cl.
CPC ............... *G01S 19/05* (2013.01); *G01C 21/165* (2013.01); *G01S 19/47* (2013.01)

(58) Field of Classification Search
None
See application file for complete search history.

(56) References Cited

U.S. PATENT DOCUMENTS

| | | | | |
|---|---|---|---|---|
| 5,862,511 | A  * | 1/1999  | Croyle et al. | 701/445 |
| 6,055,477 | A  * | 4/2000  | McBurney et al. | 701/469 |
| 6,311,129 | B1   | 10/2001 | Lin | |
| 6,408,245 | B1   | 6/2002  | An et al. | |
| 6,424,914 | B1 * | 7/2002  | Lin | 701/470 |
| 6,493,631 | B1 * | 12/2002 | Burns | 701/472 |
| 6,735,523 | B1 * | 5/2004  | Lin et al. | 701/470 |

(Continued)

FOREIGN PATENT DOCUMENTS

| | | |
|---|---|---|
| EP | 1 457 946 A1 | 9/2004 |
| EP | 2 023 084 A2 | 2/2009 |
| WO | 01/20260 A1 | 3/2001 |

OTHER PUBLICATIONS

Extended European search report, dated Sep. 25, 2014, of the corresponding European Application No. 12782570.1. (6 pages).

*Primary Examiner* — Jonathan M Dager
(74) *Attorney, Agent, or Firm* — Kilpatrick Townsend & Stockton LLP

(57) ABSTRACT

In a position calculating device, a first operational process of calculating at least a position of a moving object using the measurement result of an inertial positioning unit disposed in the moving object is performed by a first operation processing unit. A second operational process of calculating the position of the moving object using the result of the first operational process and the measurement result of a satellite positioning unit disposed in the moving object is performed by a second operation processing unit. An operational coefficient of the first operational process is adjusted using the result of the first operational process and the result of the second operational process by an operational coefficient adjusting unit.

6 Claims, 11 Drawing Sheets

(56) References Cited

U.S. PATENT DOCUMENTS

| | | | |
|---|---|---|---|
| 7,409,289 B2* | 8/2008 | Coatantiec et al. | 701/472 |
| 7,586,441 B2* | 9/2009 | Huang et al. | 342/357.66 |
| 7,987,049 B2* | 7/2011 | Hayashi et al. | 701/472 |
| 8,614,641 B2* | 12/2013 | Yule et al. | 342/357.28 |
| 2001/0020216 A1* | 9/2001 | Lin | 701/216 |
| 2002/0015439 A1* | 2/2002 | Kohli et al. | 375/148 |
| 2002/0089450 A1* | 7/2002 | Dowdle et al. | 342/453 |
| 2002/0120400 A1* | 8/2002 | Lin | 701/214 |
| 2002/0126044 A1* | 9/2002 | Gustafson et al. | 342/357.12 |
| 2003/0132878 A1* | 7/2003 | Devereux et al. | 342/357.06 |
| 2003/0146869 A1* | 8/2003 | Lin et al. | 342/357.14 |
| 2003/0149528 A1* | 8/2003 | Lin | 701/214 |
| 2004/0145519 A1* | 7/2004 | Cho | 342/357.06 |
| 2005/0162312 A1* | 7/2005 | Riday | 342/357.13 |
| 2005/0203701 A1* | 9/2005 | Scherzinger | 701/207 |
| 2006/0071851 A1* | 4/2006 | Graas et al. | 342/357.14 |
| 2006/0293853 A1* | 12/2006 | Chiou et al. | 701/223 |
| 2007/0016371 A1* | 1/2007 | Waid et al. | 701/213 |
| 2007/0205941 A1* | 9/2007 | Riley et al. | 342/357.12 |
| 2008/0071469 A1* | 3/2008 | Caveney | 701/207 |
| 2008/0088507 A1* | 4/2008 | Smith et al. | 342/386 |
| 2008/0091350 A1* | 4/2008 | Smith et al. | 701/213 |
| 2008/0117100 A1* | 5/2008 | Wang et al. | 342/357.02 |
| 2008/0262728 A1* | 10/2008 | Lokshin et al. | 701/216 |
| 2008/0270026 A1* | 10/2008 | Han | 701/213 |
| 2008/0279421 A1* | 11/2008 | Hamza et al. | 382/103 |
| 2008/0284643 A1* | 11/2008 | Scherzinger et al. | 342/357.02 |
| 2009/0093959 A1* | 4/2009 | Scherzinger et al. | 701/215 |
| 2009/0287414 A1* | 11/2009 | Vickery | 701/220 |
| 2009/0315772 A1* | 12/2009 | Wengler et al. | 342/357.15 |
| 2010/0019963 A1 | 1/2010 | Gao et al. | |
| 2010/0117894 A1* | 5/2010 | Velde et al. | 342/357.02 |
| 2010/0117895 A1* | 5/2010 | Mizuochi et al. | 342/357.02 |
| 2010/0117897 A1* | 5/2010 | Riley et al. | 342/357.09 |
| 2010/0121573 A1* | 5/2010 | Imafuku et al. | 701/220 |
| 2010/0194634 A1* | 8/2010 | Biacs et al. | 342/357.09 |
| 2010/0312461 A1* | 12/2010 | Haynie et al. | 701/117 |
| 2011/0001663 A1* | 1/2011 | Anand et al. | 342/357.23 |
| 2011/0148695 A1* | 6/2011 | Mizuochi | 342/357.23 |
| 2011/0148697 A1* | 6/2011 | Thiel et al. | 342/357.26 |
| 2011/0163913 A1* | 7/2011 | Cohen et al. | 342/357.29 |
| 2011/0298658 A1* | 12/2011 | Riley et al. | 342/357.26 |
| 2012/0032842 A1* | 2/2012 | Smith et al. | 342/357.29 |
| 2012/0146847 A1* | 6/2012 | Janky et al. | 342/357.23 |
| 2013/0344901 A1* | 12/2013 | Garin et al. | 455/456.6 |
| 2014/0080514 A1* | 3/2014 | Das et al. | 455/456.1 |
| 2014/0104101 A1* | 4/2014 | Mizuochi | 342/357.3 |
| 2014/0106775 A1* | 4/2014 | Mizuochi | 455/456.1 |

* cited by examiner

| STATE X | INPUT U | OBSERVABLE Z |
|---|---|---|
| (1) INS OPERATIONAL POSITION ERROR<br>(2) INS OPERATIONAL VELOCITY ERROR<br>(3) INS OPERATIONAL POSTURE ANGLE ERROR<br>(4) INS ACCELERATION BIAS<br>(5) INS ANGULAR VELOCITY BIAS<br>(6) CLOCK BIAS | (1) INS OPERATIONAL POSITION<br>(2) INS OPERATIONAL VELOCITY<br>(3) INS OPERATIONAL POSTURE ANGLE | (1) GPS OPERATIONAL VELOCITY<br>(2) CONSTRAINT CONDITION (STOPPING OR MOVING) BASED ON MOVEMENT MODEL |
| (1) INS OPERATIONAL POSITION ERROR<br>(2) INS OPERATIONAL VELOCITY ERROR<br>(3) INS OPERATIONAL POSTURE ANGLE ERROR<br>(4) INS ACCELERATION BIAS<br>(5) INS ANGULAR VELOCITY BIAS<br>(6) CLOCK BIAS | (1) INS OPERATIONAL POSITION<br>(2) INS OPERATIONAL VELOCITY<br>(3) INS OPERATIONAL POSTURE ANGLE | (1) PSEUDO-DISTANCE VARIATION<br>(2) CONSTRAINT CONDITION (STOPPING OR MOVING) BASED ON MOVEMENT MODEL |
| (1) INS OPERATIONAL POSITION ERROR<br>(2) INS OPERATIONAL VELOCITY ERROR<br>(3) INS OPERATIONAL POSTURE ANGLE ERROR | (1) INS OPERATIONAL POSITION<br>(2) INS OPERATIONAL VELOCITY<br>(3) INS OPERATIONAL POSTURE ANGLE | GPS OPERATIONAL VELOCITY |
| (1) INS OPERATIONAL POSITION ERROR<br>(2) INS OPERATIONAL VELOCITY ERROR<br>(3) INS OPERATIONAL POSTURE ANGLE ERROR | (1) INS OPERATIONAL POSITION<br>(2) INS OPERATIONAL VELOCITY<br>(3) INS OPERATIONAL POSTURE ANGLE | PSEUDO-DISTANCE VARIATION |
| . . . | . . . | . . . |

FIG. 3

FIRST WEIGHT SETTING CONDITION

| LOW WEIGHT SETTING CONDITION | HIGH WEIGHT SETTING CONDITION |
|---|---|
| POSITIONING ENVIRONMENT IS MULTIPATH ENVIRONMENT | POSITIONING ENVIRONMENT IS OPEN SKY ENVIRONMENT |

FIG. 4

SECOND WEIGHT SETTING CONDITION

| CONDITION No. | LOW WEIGHT SETTING CONDITION | HIGH WEIGHT SETTING CONDITION |
|---|---|---|
| A | RELIABILITY OF GPS OPERATIONAL POSITION = LOW | RELIABILITY OF GPS OPERATIONAL POSITION = HIGH |
| B | RELIABILITY OF GPS MEASUREMENT INFORMATION = LOW | RELIABILITY OF GPS MEASUREMENT INFORMATION = HIGH |
| C | RELIABILITY OF SECOND OPERATIONAL POSITION = LOW | RELIABILITY OF SECOND OPERATIONAL POSITION = HIGH |
| D | RELIABILITY OF TIME INFORMATION = LOW | RELIABILITY OF TIME INFORMATION = HIGH |
| ... | ... | ... |

FIG. 5

(1)
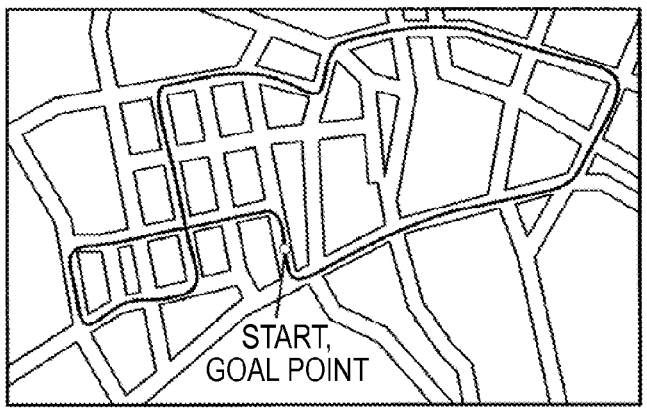
TRUE LOCUS
(2)
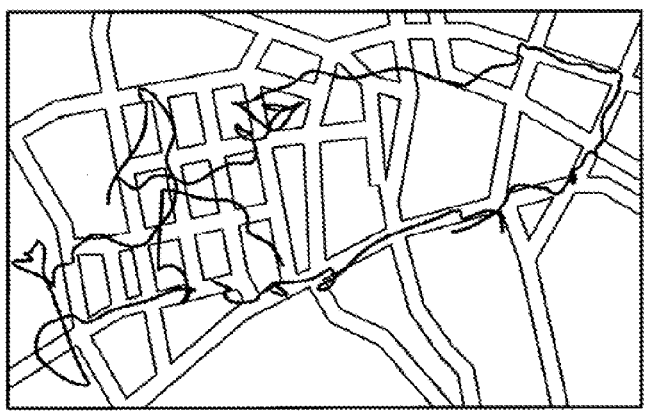
GPS OPERATIONAL POSITION
(3)
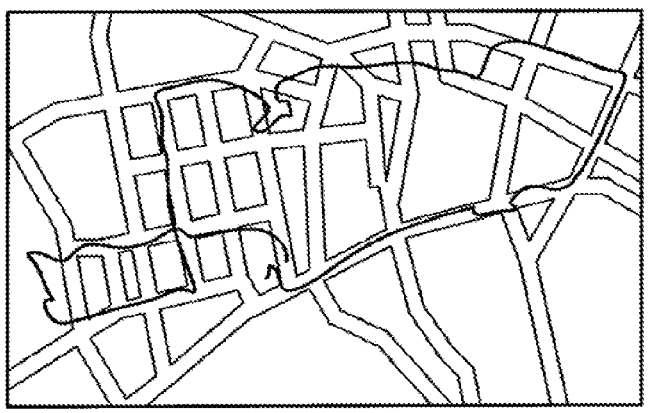
SECOND OPERATIONAL POSITION
FIG. 6

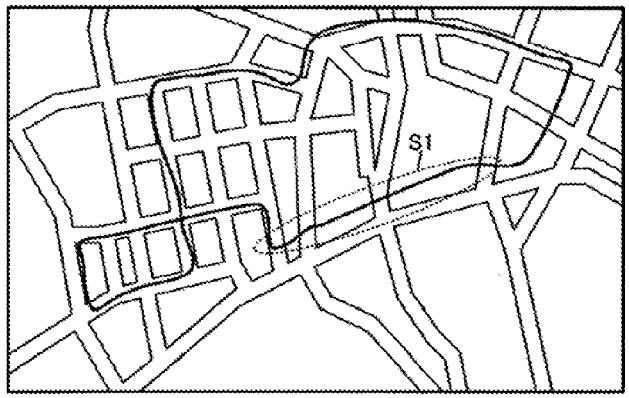
(1) FIRST OPERATIONAL POSITION
(WITHOUT OPERATIONAL COEFFICIENT ADJUSTMENT)
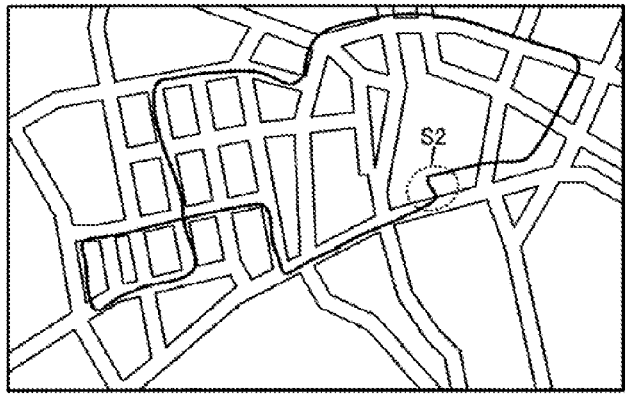
(2) FIRST OPERATIONAL POSITION
(WITH OPERATIONAL COEFFICIENT ADJUSTMENT, WITHOUT WEIGHT SETTING)
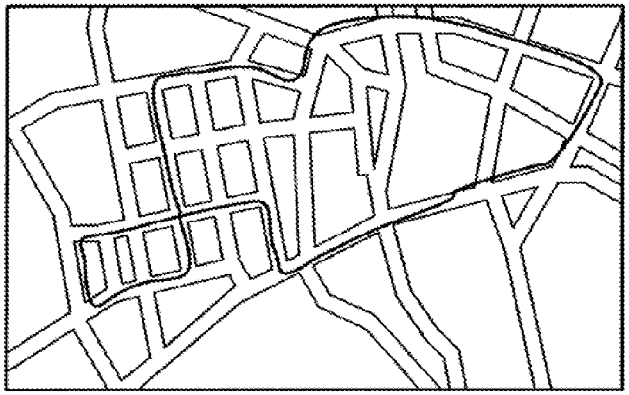
(3) FIRST OPERATIONAL POSITION
(WITH OPERATIONAL COEFFICIENT ADJUSTMENT, WITH WEIGHT SETTING)
FIG. 7

POSITION CALCULATING METHOD AND POSITION CALCULATING DEVICE

This application is a National Phase of International Application No. PCT/JP2012/002967, filed May 2, 2012, which claims priority to Japanese Patent Application No. 2011-105614, filed May 10, 2011, the entireties of which are is hereby incorporated by reference

BACKGROUND

1. Technical Field

The present invention relates to a position calculating method and the like using both measurement results of an inertial positioning unit and a satellite positioning unit.

2. Related Art

In various fields related to so-called seamless positioning, motion sensing, and posture control, use of an inertial sensor has attracted attention. An acceleration sensor, a gyro sensor, a pressure sensor, a geomagnetic sensor, and the like are widely used as the inertial sensor. An inertial navigation system (hereinafter, referred to as "INS") which performs an inertial navigation operation using detection results of the inertial sensor has also been invented.

In the INS, there is a problem in that the position calculation accuracy is lowered due to various error components which can be included in the detection results of a inertial sensor, and thus various techniques for improving the position calculation accuracy have been invented. For example, US 2010/0019963 discloses a technique of correcting an INS operation result using a GPS (Global Positioning System).

SUMMARY

The technique of correcting the INS operation result using the GPS is based on the premise that the GPS operation result is correct. The same is true of the technique disclosed in US 2010/0019963. However, the operation result accuracy of the GPS operation result may be lowered due to various factors such as signal intensities and reception environments of GPS satellite signals received from GPS satellites, arrangement of GPS satellites in the sky, and multipath.

When the INS operation result is corrected using the GPS operation result as described in US 2010/0019963 in spite of the lowering in the accuracy of the GPS operation result, there is a problem in that the accuracy of position calculation is lowered.

The invention is made in consideration of the above-mentioned circumstances and an object thereof is to provide a technique of more accurately calculating a position using both measurement results of a satellite positioning unit and an inertial positioning unit.

According to a first aspect of the invention for achieving the above-mentioned object, there is provided a position calculating method including: performing a first operational process of calculating at least a position of a moving object using the measurement result of an inertial positioning unit disposed in the moving object; performing a second operational process of calculating the position of the moving object using the result of the first operational process and the measurement result of a satellite positioning unit disposed in the moving object; and adjusting an operational coefficient of the first operational process using the result of the first operational process and the result of the second operational process.

According to another aspect of the invention, there is provided a position calculating device including: a first operation processing unit that performs a first operational process of calculating at least a position of a moving object using the measurement result of an inertial positioning unit disposed in the moving object; a second operation processing unit that performs a second operational process of calculating the position of the moving object using the result of the first operational process and the measurement result of a satellite positioning unit disposed in the moving object; and an adjustment unit that adjusts an operational coefficient of the first operational process using the result of the first operational process and the result of the second operational process.

According to the first aspect and the like of the invention, the first operational process of calculating at least the position of the moving object using the measurement result of the inertial positioning unit disposed in the moving object is performed. The second operational process of calculating the position of the moving object using the result of the first operational process and the measurement result of the satellite positioning unit disposed in the moving object is performed. The operational coefficient of the first operational process is adjusted using the result of the first operational process and the result of the second operational process.

The operational process includes the first operational process using the measurement result of the inertial positioning unit and the second operational process using the result of the first operational process and the measurement result of the satellite positioning unit. By adjusting the operational coefficient of the first operational process using the result of the first operational process and the result of the second operational process, it is possible to enhance the accuracy of position calculation in the first operational process.

A second aspect of the invention provides the position calculating method according to the first aspect, in which the measurement result of the inertial positioning unit includes an inertial positioning position, the first operational process includes a predetermined error estimating operation of estimating a first position error included in a calculated first operational position, and the adjusting of the operational coefficient includes: estimating an inertial positioning error included in the inertial positioning position using the first position error and a second operational position calculated in the second operational process; and adjusting the operational coefficient using the inertial positioning error.

According to the second aspect of the invention, the first position error included in the first operational position calculated in the first operational process is estimated by performing a predetermined error estimating operation. The inertial positioning error included in the inertial positioning position included in the measurement result of the inertial positioning unit is estimated using the first position error and the second operational position calculated in the second operational process. By using the first position error and the second operational position, it is possible to appropriately estimate the inertial positioning error. By adjusting the operational coefficient of the first operational process using the inertial positioning error, it is possible to enhance the accuracy of position calculation in the first operational process.

A third aspect of the invention provides the position calculating method according to the second aspect, in which the estimating of the inertial positioning error includes: calculating a difference between the inertial positioning position and the second operational position; and calculating the inertial positioning error by averaging the first position error and the difference.

According to the third aspect of the invention, the difference between the inertial positioning position and the second operational position is calculated. By averaging the first position error and the difference, it is possible to appropriately estimate the inertial positioning error.

A fourth aspect of the invention provides the position calculating method according to the third aspect, in which the averaging process is a process of setting weights of the first position error and the difference on the basis of one or both of a positioning environment and reliability of the measurement result of the satellite positioning unit and performing a weighted averaging operation.

According to the fourth aspect of the invention, in the averaging process, the weights of the first position error and the difference are set to perform a weighted averaging operation on the basis of one or both of the positioning environment and the reliability of the measurement result of the satellite positioning unit. Accordingly, it is possible to more accurately estimate the inertial positioning error on the basis of the positioning environment or the reliability of the measurement result of the satellite positioning unit.

A fifth aspect of the invention provides the position calculating method according to any one of the first to fourth aspects, in which the measurement result of the inertial positioning unit includes an inertial positioning position, and the first operational process is a Kalman filtering process using the inertial positioning position as an input.

According to the fifth aspect of the invention, by performing the Kalman filtering process, which uses the inertial positioning position as an input, as the first operational process, it is possible to simply and appropriately calculate the position or the like of the moving object.

A sixth aspect of the invention provides the position calculating method according to the fifth aspect, in which the measurement result of the satellite positioning unit includes a velocity, and the Kalman filtering process is a process using the velocity as an observable.

According to the sixth aspect of the invention, by using the velocity included in the measurement result of the satellite positioning unit as an observable in the Kalman filtering process according to the fifth aspect, it is possible to more accurately calculate the position or the like of the moving object.

A seventh aspect of the invention provides the position calculating method according to any one of the first to sixth aspects, in which the measurement result of the satellite positioning unit includes a satellite positioning position, and the second operational process is a Kalman filtering process using the result of the first operational process as an input and using the satellite positioning position as an observable.

According to the seventh aspect of the invention, by performing a Kalman filtering process, which uses the result of the first operational process as an input and uses the satellite positioning position included in the measurement result of the satellite positioning unit as an observable, as the second operational process, it is possible to simply and appropriately calculate the position of the moving object.

BRIEF DESCRIPTION OF THE DRAWINGS

FIG. 3 is a diagram illustrating input and output data in a first Kalman filtering process.

FIG. 4 is a diagram illustrating a first weight setting condition.

FIG. 5 is a diagram illustrating a second weight setting condition.

FIG. 6 is a diagram illustrating an example of an experiment result of position calculation.

FIG. 7 is a diagram illustrating an example of an experiment result of position calculation.

DESCRIPTION OF EXEMPLARY EMBODIMENTS

1. Principle 1-1. Configuration

Figure 1:
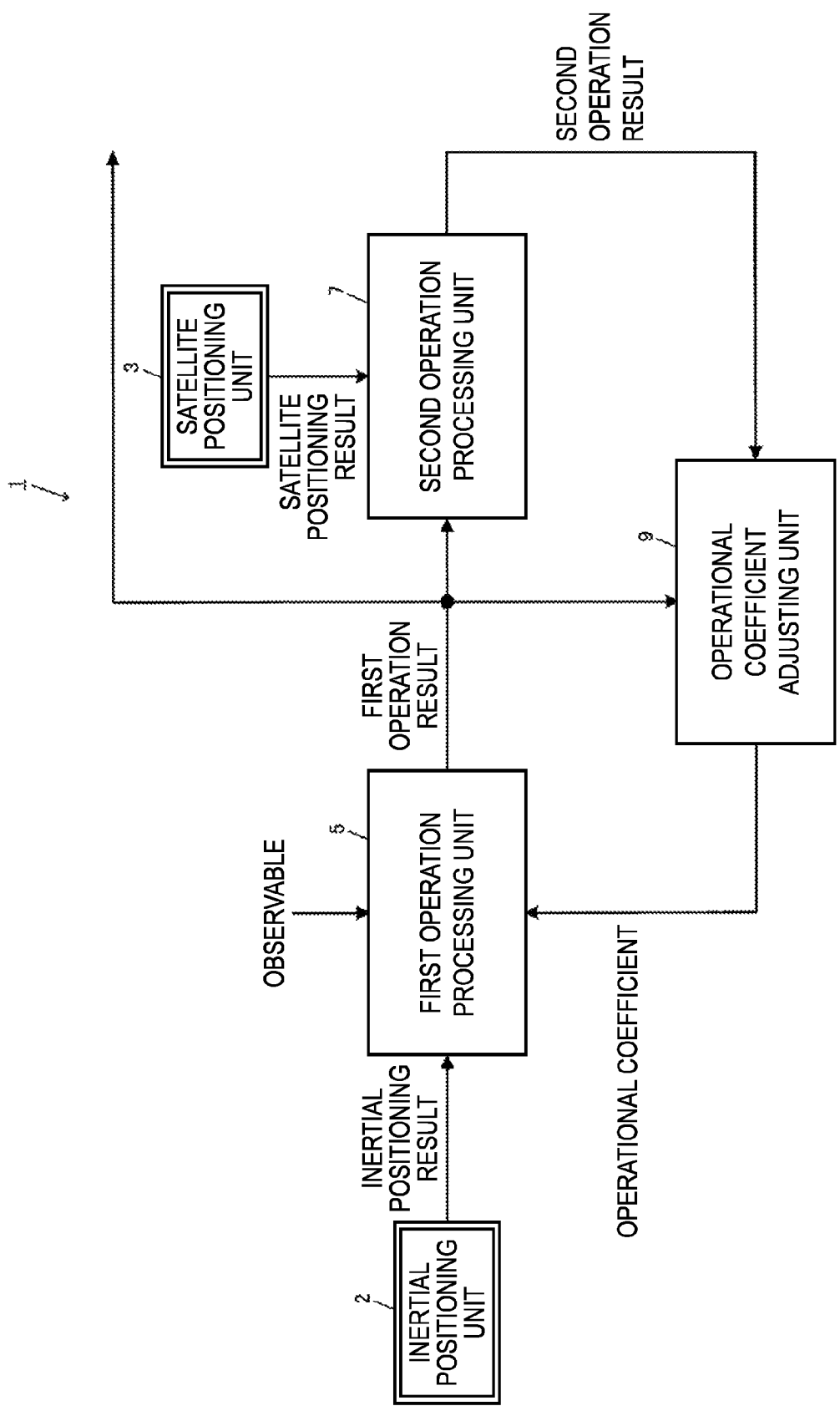
FIG. 1 is a diagram illustrating the configuration of a position calculating device.

FIG. 1 is a diagram illustrating a principal configuration of a position calculating device 1 according to this exemplary embodiment. The position calculating device 1 is a device (system) which is disposed in a moving object so as to calculate the position of the moving object. Examples of the moving object include a person in addition to an automobile, a motorcycle, a bicycle, a ship, and a train. A person may carry the position calculating device 1 as if the person themself had the position calculating device 1 installed.

In the drawings referred to in this specification, units (modules) are indicated by a double line and processing blocks performing an operational process using the measurement results of the units are indicated by a single line, so as to distinguish both from each other.

The position calculating device 1 includes an inertial positioning unit 2 and a satellite positioning unit 3 as units (modules). The position calculating device 1 further includes a first operation processing unit 5, a second operation processing unit 7, and an operational coefficient adjusting unit 9 as principal processing blocks. The position calculating device 1 may be constructed by the units and the processing blocks, or the position calculating device 1 may be constructed by only the processing blocks other than the units.

The inertial positioning unit 2 is a unit that performs a positioning operation using an inertial navigation. The inertial positioning unit 2 is a unit employing an inertial sensor such as an acceleration sensor or a gyro sensor, an inertial measurement unit (IMU) obtained by packaging the inertial sensor, an inertial navigation system (INS) obtained by packaging the inertial measurement unit and an operation processing unit, or the like.

The satellite positioning unit 3 is a unit that performs a positioning operation using a satellite positioning system and can employ, for example, a GPS (Global Positioning System) which is a kind of satellite positioning system.

The first operation processing unit 5 calculates at least the position of a moving object by performing a predetermined first operational process using both the measurement result of the inertial positioning unit 2 and a given observable. In this exemplary embodiment, an application example suitable for the first operational process is a Kalman filtering process.

The second operation processing unit 7 calculates the position of the moving object by performing a predetermined second operational process using a first operation result which is the operation result of the first operation processing unit 5 and the measurement result of the satellite positioning unit 3. In this exemplary embodiment, an application example suitable for the second operational process includes a Kalman filtering process, a sigma point filtering process, or a regression filtering process.

The operational coefficient adjusting unit 9 adjusts the operational coefficient of the first operational process using the first operation result input from the first operation processing unit 5 and the second operation result input from the second operation processing unit 7. The first operation processing unit 5 performs the first operational process using the operational coefficient adjusted by the operational coefficient adjusting unit 9.

Figure 2:
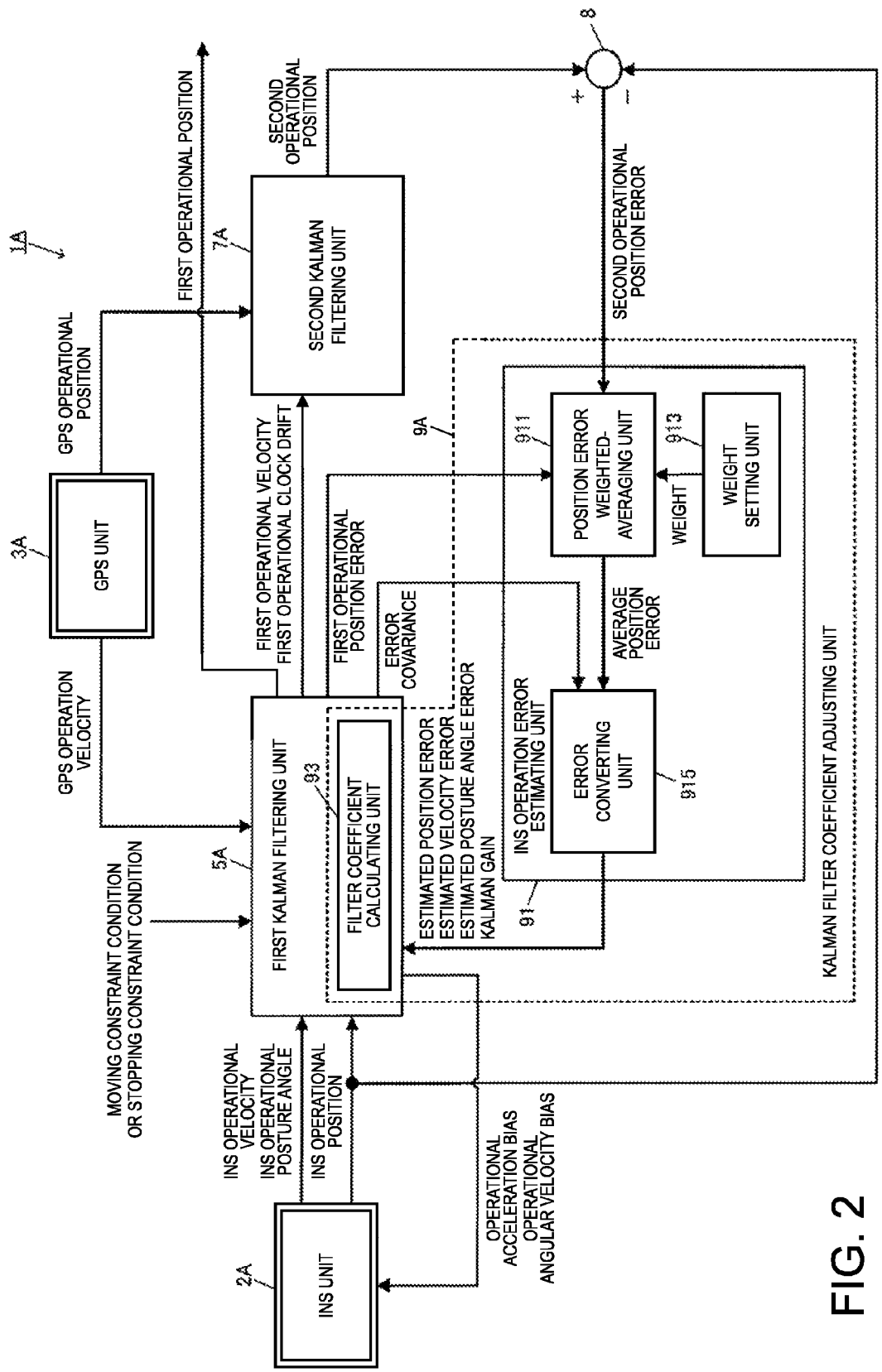
FIG. 2 is a diagram illustrating the configuration of a first position calculating device.

FIG. 2 is a diagram illustrating the configuration of a first position calculating device 1A employing the position calculating device 1 shown in FIG. 1. The first position calculating device 1A includes an INS unit 2A, a GPS unit 3A, a first Kalman filtering unit 5A, a second Kalman filtering unit 7A, and a Kalman filter coefficient adjusting unit 9A.

The first position calculating device 1A is a system employing the INS unit 2A as the inertial positioning unit 2 and employing the GPS unit 3A as the satellite positioning unit 3. The first position calculating device also employs the first and second Kalman filtering units 5A and 7A as the first and second operation processing units 5 and 7.

The INS unit 2A is configured to output INS measurement information such as an acceleration or an angular velocity measured in a local coordinate system by the IMU. The INS unit 2A is configured to calculate and output the position, the velocity, and the posture angle of a moving object by performing an inertial navigation operation using the INS measurement information. In this exemplary embodiment, the INS unit 2A calculates and outputs an INS operational position (inertial positioning position), an INS operational velocity, and an INS operational posture angle in an absolute coordinate system.

The GPS unit 3A is configured to receive GPS satellite signals emitted from GPS satellites and to measure and output GPS measurement information such as a code phase, a Doppler frequency, a pseudo-distance, and a pseudo-distance variation. The GPS unit 3A is configured to calculate and output the position or the velocity of a moving object by performing a GPS operation using the GPS measurement information. In this exemplary embodiment, the GPS unit 3A calculates and outputs a GPS operational position (satellite positioning position) and a GPS operational velocity in an absolute coordinate system.

The local coordinate system is a local coordinate system (sensor coordinate system) correlated with the inertial sensor of the INS unit 2A. On the contrary, the absolute coordinate system is a coordinate system in which a moving space of a moving object is defined. For example, an NED coordinate system known as a north-east-down coordinate system, an ENU coordinate system known as an east-north-up coordinate system, or an ECEF coordinate system known as an earth-centered earth-fixed coordinate system can be used as the absolute coordinate system.

In the following expressions, it is assumed that the INS unit 2A calculates and outputs the position, the velocity, and the posture angle of the moving object in the ENU coordinate system and the GPS unit 3A calculates and outputs the position and the velocity of the moving object in the ECEF coordinate system. It is assumed that the first and second Kalman filtering processes are performed in the ENU coordinate system. The properties such as the acceleration and the velocity are actually expressed as vectors having a magnitude and a direction. However, in this specification, the acceleration or the velocity is simply mentioned without using the term "vector".

The first Kalman filtering unit 5A calculates the position, the velocity, or the posture angle of the moving object by performing an operational process based on the theory of the Kalman filter. For example, the INS operational position, the INS operational velocity, and the INS operational posture angle input from the INS unit 2A are used as an input U (control input). The GPS operational velocity input from the GPS unit 3A or a given constraint condition determined on the basis of a movement model of a moving object is used as an observable Z. A prediction operation (time update) and a correction operation (observation update) of the Kalman filter are performed to calculate an estimated state value.

In the first Kalman filtering process, the moving object state "X" to be estimated is set, for example, as expressed by Expression 1 and Expression 2.

Expression 1

$$X_1 = [\delta V_E, \delta V_N, \delta V_U, \psi_x, \psi_y, \psi_z, b_{ax}, b_{ay}, b_{az}, b_{gx}, b_{gy}, b_{gz}, d]^T \quad (1)$$

Expression 2

$$X_2 = [\delta P_E, \delta P_N, \delta P_U]^T \quad (2)$$

In the state "$X_1$" shown in Expression 1, "($\delta V_E$, $\delta V_N$, $\delta V_U$)" represents an error of the INS operational velocity calculated in the ENU coordinate system. "($\psi_x$, $\psi_y$, $\psi_z$)" represents an error of the INS operational posture angle calculated in the local coordinate system. "($b_{ax}$, $b_{ay}$, $b_{az}$)" represents a bias of the acceleration measured in the local coordinate system. "($b_{gx}$, $b_{gy}$, $b_{gz}$)" represents a bias of the acceleration measured in the local coordinate system. In addition, "d" represents a drift of an internal clock (clock drift) of the GPS unit 3A.

In the state "$X_2$" shown in Expression 2, "($\delta P_E$, $\delta P_N$, $\delta_U$)" represents an error of the INS operational position calculated in the ENU coordinate system.

As can be seen from Expressions 1 and 2, the first Kalman filtering process in this exemplary embodiment is an error estimation type Kalman filtering process of estimating the error included in the operation result of the INS unit 2A. That is, the errors included in the operation result of the INS unit 2A are estimated as the states "$X_1$" and "$X_2$".

In the first Kalman filtering process, an error covariance matrix "$P_{11}$" including covariance of errors of the components of the state "$X_1$", an error covariance matrix "$P_{22}$" including covariance of errors of the components of the state "$X_2$", an error covariance matrix "$P_{21}$" including covariance of errors of the components of the state "$X_2$" with respect to the components of the state "$X_1$", an error covariance matrix "$P_{12}$" including covariance of errors of the components of the state "$X_1$" with respect to the components of the state "$X_2$" are together calculated.

In the correction operation of the first Kalman filtering process, the state "X" predicted through the prediction operation is corrected using the velocity (hereinafter, referred to as "GPS operational velocity") calculated by the GPS unit 3A as an observable "Z".

Specifically, the correction operation is performed, for example, using the observable "Z" given by Expression 3.

Expression 3

$$Z = \begin{bmatrix} V_E \\ V_N \\ V_U \end{bmatrix}_{INS} - C_{ECEF}^{ENU} \begin{bmatrix} V_X \\ V_Y \\ V_Z \end{bmatrix}_{GPS} \quad (3)$$

Here, "$(V_E, V_N, V_U)_{INS}$" represents the INS operational velocity calculated in the ENU coordinate system by the INS unit 2A. "$(V_X, V_Y, V_Z)_{GPS}$" represents the GPS operational velocity calculated in the ECEF coordinate system by the GPS unit 3A. "$C_{ECEF}^{ENU}$" represents a coordinate transformation matrix from the ECEF coordinate system to the ENU coordinate system.

The first Kalman filtering process is configured to apply a constraint condition based on a movement model of a moving object as the observable "Z" independently of the GPS operational velocity. Specifically, two types of velocity constraint conditions of a "stopping velocity constraint condition" which is a velocity constraint condition when the moving object stops and a "moving velocity constraint condition" which is a velocity constraint condition when the moving object moves can be applied.

The stopping velocity constraint condition (first constraint condition) is a constraint condition which can be applied when a moving object stops. When a moving object stops, the velocity of the moving object is ideally zero. Therefore, when it is determined that the moving object stops, the "velocity component of moving object for each axis=0" can be given as the observable "Z".

The moving velocity constraint condition (second constraint condition) is a constraint condition which can be applied when a moving object moves. For example, when a four-wheeled automobile is assumed as the moving object, it can be generally assumed that the four-wheeled automobile does not jump nor slides laterally. Therefore, when it is determined that the moving object moves, the "velocity component of moving object for each of vertical and lateral directions=0" can be given as the observable "Z". For moving objects other than the four-wheeled automobile, the moving (velocity) constraint condition can be appropriately set on the basis of the constraints on the moving directions or the magnitudes of velocities of the moving objects.

In the state "$X_1$" obtained through the first Kalman filtering process, the INS operational velocity is corrected using the velocity error "$(\delta V_E, \delta V_N, \delta V_U)$" and the result is output as a first operational velocity to the second Kalman filtering unit 7A. The clock drift "d" is output as a first operational clock drift to the second Kalman filtering unit 7A.

The acceleration bias "$(b_{ax}, b_{ay}, b_{az})$" and the angular velocity bias "$(b_{gx}, b_{gy}, b_{gz})$" are fed back to the INS unit 2A. The INS unit 2A compensates for (calibrates) the acceleration sensor and the gyro sensor using the acceleration bias "$(b_{ax}, b_{ay}, b_{az})$" and the angular velocity bias "$(b_{gx}, b_{gy}, b_{gz})$" input from the first Kalman filtering unit 5A.

In the state "$X_2$" obtained through the first Kalman filtering process, the INS operational position is corrected using the position error "$(\delta P_E, \delta P_N, \delta P_U)$" and the result is output as a first operational position. The first operational position is used as the final position of the moving object for various application processes.

In the first Kalman filtering process, a predetermined error estimating operation is performed to estimate a first operational position error included in the first operational position. Specifically, the first operational position error "$P1_{err}$" is calculated and estimated, for example, using Expression 4.

Expression 4

$$P1_{err} = \begin{bmatrix} \delta V_E \\ \delta V_N \\ \delta V_U \end{bmatrix} \cdot \Delta t + X_2 \quad (4)$$

In Expression 4, "$\Delta t$" represents the operation time interval of the first Kalman filtering process. The variation in position error in the operation time interval is calculated by multiplying the velocity errors "$(\delta_E, \delta V_N, \delta V_U)$" which are first to third components of the state "$X_1$" by the operation time interval "$\Delta t$". Then, the first operational position error "$P1_{err}$" is calculated by adding the variation to the position error "$(\delta P_E, \delta P_N, \delta P_U)$" of the state "$X_2$".

The second Kalman filtering unit 7A calculates the position of the moving object using the first operational velocity and the first operational clock drift input from the first Kalman filtering unit 5A as an input U and using the GPS operational position input from the GPS unit 3A as an observable "Z". The position calculated by the second Kalman filtering unit 7A is output as a second operational position to an addition and subtraction unit 8.

In the second Kalman filtering process, the state "X" of the moving object to be estimated is set, for example, as expressed by Expression 5.

Expression 5

$$X = [P_E, P_N, P_U, d]^T \quad (5)$$

Here, "$(P_E, P_N, P_U)$" represents the position of the moving object expressed in the ENU coordinate system and "d" represents the clock drift.

In the second Kalman filtering process, the observable "Z" is set, for example, as expressed by Expression 6.

Expression 6

$$Z = [P_X, P_Y, P_Z]_{GPS}^T \quad (6)$$

Here, "$(P_X, P_Y, P_Z)_{GPS}$" represents the GPS operational position expressed in the ECEF coordinate system.

This exemplary embodiment is characterized in that the first Kalman filtering process does not use the GPS operational position as the observable "Z" but uses the GPS operational velocity as the observable "Z". Instead, the GPS operational position is used as the observable "Z" of the second Kalman filtering process. This is because it is assumed that a large error can be included in the GPS operational position because various error factors are present in the GPS. The typical example thereof is a multipath environment.

When the GPS operation is performed in a multipath environment, the accuracy of the position to be calculated is lowered. Accordingly, when the GPS operational position and the INS operational position are simply coupled, the accuracy of the calculated position may be lowered due to attraction to the error of the GPS operational position. Therefore, the position calculation is divided into the first operational process (first Kalman filtering process) and the second operational process (second Kalman filtering process) and the first operational process calculates the position of the moving object without using the GPS operational position.

In the GPS, the velocity of the moving object along with the position of the moving object can be calculated. The velocity is less likely to be influenced by the multipath than the position and does not have a large influence on the coupling to the INS operation result. Therefore, in the first Kalman filtering process, the position of the moving object is calculated using the GPS operational velocity as the observable.

The addition and subtraction unit 8 calculates a difference between the second operational position output from the second Kalman filtering unit 7A and the INS operational position output from the INS unit 2A. For the purpose of convenience, the difference is referred to as a "second operational position error". The second operational position error "$P2_{err}$" calculated by the addition and subtraction unit 8 is output to the Kalman filter coefficient adjusting unit 9A.

The Kalman filter coefficient adjusting unit 9A includes an INS operation error estimating unit 91 and a filter coefficient calculating unit 93 and adjusts the filter coefficient of the first Kalman filtering process. In this exemplary embodiment, the filter coefficient calculating unit 93 is shown and described as a functional unit of the first Kalman filtering unit 5A.

The filter coefficient calculating unit 93 calculates the filter coefficient of the first Kalman filtering process using the INS operation error estimated by the INS operation error estimating unit 91. Examples of the filter coefficient to be adjusted include states "$X_1$" and "$X_2$" and error covariance matrices "$P_{11}$", "$P_{22}$", "$P_{21}$", and "$P_{12}$". The method of adjusting the filtering coefficient will be described later in detail.

The INS operation error estimating unit 91 is a functional unit that estimates an INS operation error which is an error included in the INS operation result and includes, for example, a position error weighted-averaging unit 911, a weight setting unit 913, and an error converting unit 915.

The position error weighted-averaging unit 911 weighted-averages the first operational position error "$P1_{err}$" and the second operational position error "$P2_{err}$" using the weights set by the weight setting unit 913 to calculate the operational position error (inertial positioning error) of the INS unit 2A. Specifically, the average position error "$aveP_{err}$" is calculated, for example, using Expression 7.

Expression 7

$$aveP_{err} = P1_{err} \cdot \alpha + P2_{err} \cdot (1-\alpha) \quad (7)$$

Here, "$\alpha$" represents the weight of the first operational position error "$P1_{err}$" and satisfies "$0 \leq \alpha \leq 1$". The weight of the second operational position error "$P2_{err}$" is "$1-\alpha$".

The weight setting unit 913 sets the weight "$\alpha$" of the weighted average of the position error weighted-averaging unit 911 on the basis of plural factors such as a positioning environment or reliability of the measurement result of the GPS unit 3A. The weight setting method will be described later in detail.

The error converting unit 915 converts the average position error "$aveP_{err}$" input from the position error weighted-averaging unit 911 into the INS operation error using the error covariance "P" input from the first Kalman filtering unit 5A. The method of converting the INS operation error will also be described later in detail.

FIG. 3 is a diagram illustrating input and output data of the first Kalman filtering unit 5A. A table in which the state "X", the input "U", and the observable "Z" are correlated is shown. There are various coupling methods. Among these, a method called loose coupling (sparse coupling) and a method called tight coupling (dense coupling) are generally used.

The loose coupling method is a coupling method in which the GPS and the INS are relatively weakly coupled to each other. In this method, for example, the INS operation error (such as the INS operational position error, the INS operational velocity error, the INS operational posture angle error, and the INS acceleration bias, the INS angular velocity bias, and the clock bias) is used as the state "X". The INS operation result (such as the INS operational position, the INS operational velocity, and the INS operational posture angle) is used as the input "U", and the GPS operation result (such as the GPS operational velocity) or the constraint condition (such as stopping or moving constraint conditions) based on a movement model is used as the observable "Z".

The tight coupling method is a coupling method in which the GPS and the INS are relatively strongly coupled to each other. In this method, for example, the input "U" and the state "X" are the same as described above and the GPS measurement information (such as a pseudo-distance variation) or a constraint condition based on the movement model is used as the observable "Z".

The components of the state "X", the input "U", and the observable "Z" can be appropriately added/deleted. For example, the bias components may be deleted from the state "X" and the INS operational position error, the INS operational velocity error, and the INS operational posture angle error may be used as the components of the state "X". The GPS operational velocity or the pseudo-distance variation, and the constraint condition based on the movement model may be together used as the observable "Z" or only any one thereof may be used.

1-2. Weight Setting Method

The method of setting the weight "$\alpha$" will be described below. In this exemplary embodiment, any one of three types of values of a high set value "$\alpha_{high}$" determined to be a relatively high value, a middle set value "$\alpha_{middle}$" determined to be a middle value, and a low set value "$\alpha_{low}$" determined to be a relative low value is set as the weight "$\alpha$". The specific values thereof may be appropriately determined. The weight "$\alpha$" is within a range of "0 to 1" and can be set to values such as "$\alpha_{high}=0.9$", "$\alpha_{middle}=0.5$", and "$\alpha_{low}=0.1$" or values such as "$\alpha_{high}=0.75$", "$\alpha_{middle}=0.5$", and "$\alpha_{low}=0.25$".

FIG. 4 is a diagram illustrating an example of a first weight setting condition table in which the first weight setting conditions related to the weight setting are determined. In the first weight setting condition table, a low weight setting condition and a high weight setting condition are correlated with each other. The low weight setting condition is a condition for setting the weight "$\alpha$" to the low set value "$\alpha_{low}$". The high weight setting condition is a condition for setting the weight "$\alpha$" to the high set value "$\alpha_{high}$". When any of the low weight setting condition and the high weight setting condition is not satisfied, the weight "$\alpha$" is set to the middle set value "$\alpha_{middle}$".

The first weight setting condition is a condition determined on the basis of the positioning environment. In the low weight setting condition, the positioning environment is determined to be a multipath environment. In the high weight setting condition, the positioning environment is determined to be an open sky environment.

When the positioning environment is the multipath environment, an error occurs in the observed pseudo-distance due to the influence of indirect waves. Accordingly, the accuracy of the position calculated by the GPS unit 3A is lowered. The second Kalman filtering unit 7A uses the GPS operational position as the observable "Z". Accordingly, when the accuracy of the GPS operational position is low, the second operational position is influenced accordingly.

In this case, the second operational position error "$P2_{err}$" which is calculated as a difference between the second operational position and the INS operational position has a value including the influence of the multipath. Therefore, when the positioning environment is the multipath environment, the weight "1-α" of the second operational position error "$P2_{err}$" is set to be large so as to emphasize the second operational position error "$P2_{err}$" markedly reflecting the influence of the multipath environment. This corresponds to setting the weight "α" of the first operational position error "$P1_{err}$" to be smaller.

FIG. 5 is a diagram illustrating an example of a second weight setting condition table in which second weight setting conditions related to the weight setting are determined. In the second weight setting condition table, a condition No. which is the number of the corresponding condition, a low weight setting condition, and a high weight setting condition are correlated with each other.

Condition "A" is a condition related to reliability of the GPS operational position. In the low weight setting condition, "reliability of GPS operational position=low" is determined. In the high weight setting condition, "reliability of GPS operational position=high" is determined.

When the reliability of the GPS operational position is low, the accuracy of the second operational position calculated by the second Kalman filtering unit 7A is lowered. Accordingly, the second operational position error "$P2_{err}$" which is calculated as a difference between the second operational position and the INS operational position markedly reflects the influence thereof. Therefore, when the reliability of the GPS operational position is low, the weight "α" of the first operational position error "$P1_{err}$" is set to be smaller so as to emphasize the second operational position error "$P2_{err}$".

The reliability of the GPS operational position can be determined in comprehensive consideration of plural factors such as reception environments or signal intensities of GPS satellite signals, arrangement of GPS satellites in the sky, detection of a rapid variation in position. For example, when the arrangement of the GPS satellites in the sky is not good (for example, when a DOP (Dilution of Precision) value is large), or when a large position leap occurs (that is, a position greatly spaced apart from the true position is obtained as the operation result), or when a sudden position variation in the altitude direction occurs, it can be determined that the reliability of the GPS operational position is low.

Condition "B" is a condition related to the reliability of the GPS measurement information. "Reliability of GPS measurement information=low" is determined in the low weight setting condition and "Reliability of GPS measurement information=high" is determined in the high weight setting condition. When the reliability of the GPS measurement information is low, the reliability of the calculated GPS operational position is lowered. Accordingly, in this case, the weight "α" of the first operational position error "$P1_{err}$" is set to be smaller, similarly to condition "A".

For example, when an abnormal value is suddenly mixed into the GPS measurement information in an urban canyon environment or when a contradiction occurs between the pseudo-distance variation (range rate) and the pseudo-distance (pseudo-range), it is determined that the reliability of the GPS measurement information is low.

Condition "C" is a condition related to the reliability of the second operational position. "Reliability of second operational position=low" is determined in the low weight setting condition, and "reliability of second operational position=high" is determined in the high weight setting condition. When the reliability of the second operational position calculated in the second Kalman filtering process is low, the weight "α" of the first operational position error "$P1_{err}$" is set to be smaller so as to emphasize the second operational position error "$P2_{err}$" which is calculated as a difference between the second operational position and the INS operational position.

For example, when the velocity of the moving object is zero or has a very small value but the second operational position discontinuously varies or when the sudden position leap occurs in the second operational position, it is determined that the reliability of the second operational position is low.

Condition "D" is a condition related to the reliability of time information. "Reliability of time information=high" is determined in the low weight setting condition, and "reliability of time information=low" is determined in the high weight setting condition. When the reliability of the time information is low, the reliability of the GPS operational position calculated by the GPS unit 3A is lowered. Accordingly, similarly to condition "A", the weight "α" of the first operational position error "$P1_{err}$" is set to be smaller.

For example, when a time synchronization error of the GPS is greater than a predetermined threshold value (or equal to or greater than a threshold value), it is determined that the reliability of the time information is low.

The weight "α" is determined using the above-mentioned plural conditions. First, the reliability of each determination item is converted into a numerical value for each condition. For example, by setting the state where the reliability of a determination item is the lowest to reliability "0" and setting the state where the reliability is the highest to reliability "1", the reliabilities of the determination items are converted into numerical values in the range of "0 to 1".

Then, a weight setting indication value "W" is calculated, for example, using Expression 8.

Expression 8

$$W = A \cdot k_A + B \cdot k_B + C \cdot k_C + \ldots \quad (8)$$

Here, "$k = k_A, k_B, k_C, \ldots$" represent weights of the reliabilities of the conditions "A, B, C, . . . ", and satisfy "$k_A + k_B + k_C + \ldots = \Sigma k = 1$". For simplification, "$k_A = k_B = k_C = \ldots = 1/N$" may be set. Here, "N" represents the total number of conditions to be used for the weight setting.

The weight "α" to be set is determined on the basis of the weight setting indication value "W". For example, when the weight setting indication value "W" is smaller than (or smaller than or equal to) a first threshold value "$\theta_1$", the weight "α" is set to a low set value ($\alpha = \alpha_{low}$). When the weight setting indication value "W" is larger than (or larger than or equal to) a second threshold value "$\theta_2 (> \theta_1)$", the weight "α" is set to a high set value ($\alpha = \alpha_{high}$). Otherwise, the weight "α" is set to a middle set value ($\alpha = \alpha_{middle}$).

The first weight setting condition shown in FIG. 4 and the second weight setting condition shown in FIG. 5 may be used alone or may be used together. That is, the weight may be set on the basis of the positioning environment to perform a weighted averaging operation, the weight may be set on the basis of the reliability of the measurement result of the GPS unit 3A to perform a weighted averaging operation, or the weight may be set using together the conditions to perform a weighted averaging operation. When the conditions are together used, the determination result of the first weight setting condition and the determination result of the second weight setting condition may be subjected to an AND condition or an OR condition to set the weight "α".

The determination may be performed by including the first weight setting condition in the second weight setting condition. Specifically, for example, by setting the state where the positioning environment is the best (for example, the open sky environment) to "1" and setting the state where the positioning environment is the worst (for example, the urban canyon environment) to "0", the goodness of the positioning environment is converted into numerical values. The goodness of the positioning environment converted into numerical values may be used to calculate the weight setting indication value "W" of Expression 8.

1-3. INS Operation Error Estimating Method

A method of estimating an INS operation error will be described below. For example, a Kalman filter can be used to convert an average position error into an INS operation error.

First, a difference "$V_2$" between an observable "$Z_2$" and a predicted observable "$H_{22}X_2$" is calculated using Expression 9.

Expression 9

$$V_2 = Z_2 - H_{22}X_2 = \text{ave}P_{err} - H_{22}[\delta P_E, \delta P_N, \delta P_U]^T \quad (9)$$

In Expression 9, the observable "$Z_2$" is the average position error "$\text{ave}P_{err}$". That is, "$Z_2 = \text{ave}P_{err}$" is established. "$H_{22}X_2$" is the predicted value of the observable "$Z_2$" and corresponds to the predicted value of the average position error "$\text{ave}P_{err}$". That is, Expression 9 is an expression representing that the average position error "$\text{ave}P_{err}$" is i predicted by applying the observation matrix "$H_{22}$" to the state "$X_2$" given in Expression 2. The observation matrix "$H_{22}$" is a transform matrix from the state "$X_2$" to the observable "$Z_2$".

Then, Kalman gains "$K_{12}$" and "$K_{22}$" are calculated using Expressions 10 and 11.

Expression 10

$$K_{12} = P_{12}H_{22}^T(H_{22}P_{22}H_{22}^T + R_2)^{-1} \quad (10)$$

Expression 11

$$K_{22} = P_{22}H_{22}^T(H_{22}P_{22}H_{22}^T + R_2)^{-1} \quad (11)$$

"$K_{12}$" represents the Kalman gain used to calculate the state "$X_1$" from the difference "$V_2$", and "$K_{22}$" represents the Kalman gain used to calculate the state "$X_2$" from the difference "$V_2$". "$R_2$" represents the observation error (observation noise) of the observable "$Z_2$".

The states "$X_1$" and "$X_2$" are calculated using the Kalman gains "$K_{12}$" and "$K_{22}$" and using Expressions 12 and 13.

Expression 12

$$X_1 = X_1 + K_{12}V_2 \quad (12)$$

Expression 13

$$X_2 = X_2 + K_{22}V_2 \quad (13)$$

Out of the components of the state "$X_1$" calculated using Expression 12, the velocity error and the posture angle error are fed back as the estimated velocity error "$V_{err}$" and the estimated posture angle error "$A_{err}$" to the first Kalman filtering unit 5A. The position error which is a component of the state "$X_2$" calculated using Expression 13 is fed back as the estimated position error "$P_{err}$" to the first Kalman filtering unit 5A. The Kalman gains "$K_{12}$" and "$K_{22}$" are fed back to the first Kalman filtering unit 5A.

1-4. Filter Coefficient Adjusting Method

A method of adjusting a filter coefficient will be described below. The filter coefficient calculating unit 93 calculates the filter coefficient using the INS operation error (the estimated position error "$P_{err}$", the estimated velocity error "$V_{err}$", and the estimated posture angle error "$A_{err}$"" input from the INS operation error estimating unit 91 or the Kalman gains "$K_{12}$" and "$K_{22}$".

First, the filter coefficient calculating unit 93 calculates and updates the state "$X_1$" by adding the estimated velocity error "$V_{err}$" and the estimated posture angle error "$A_{err}$" input from the INS operation error estimating unit 91 to the corresponding components (the velocity error "$(\delta V_E, \delta V_N, \delta V_U)$" and the posture angle error "$(\psi_x, \psi_y, \psi_z)$") of the state "$X_1$". The state "$X_2$" is calculated and updated by adding the estimated position error "$P_{err}$" input from the INS operation error estimating unit 91 to the components (the position error "$(\delta P_E, \delta P_N, \delta P_U)$") of the state "$X_2$".

Second, the filter coefficient calculating unit 93 calculates and updates the error covariance matrices "$P_{11}$", "$P_{22}$", "$P_{21}$", and "$P_{12}$" using the Kalman gains "$K_{12}$" and "$K_{22}$" and, for example, using Expressions 14 to 17.

Expression 14

$$P_{11} = P_{11} - K_{12}(H_{22}P_{21}) \quad (14)$$

Expression 15

$$P_{22} = P_{22} - K_{22}(H_{22}P_{22}) \quad (15)$$

Expression 16

$$P_{21} = P_{21} - K_{22}(H_{22}P_{21}) \quad (16)$$

Expression 17

$$P_{12} = P_{12} - K_{12}(H_{22}P_{22}) \quad (17)$$

2. Experiment Result

FIGS. 6 and 7 are diagrams illustrating examples of the result of an experiment in which a position is calculated using the above-mentioned position calculating method. An experiment in which the first position calculating device 1A is installed in an automobile and the automobile travels on roads of an urban area was carried out. The urban area in which the automobile travels is a multipath environment in which many high-rise buildings are present. A position was calculated while circulating the roads of the urban area shown in FIGS. 6 and 7 in the counterclockwise direction and the locus was drawn. The start point and the goal point were set below the center of the drawings.

(1) of FIG. 6 shows the true locus (reference locus) of the automobile. (2) of FIG. 6 shows the locus of the GPS operational position which is the output of the GPS unit 3A. (3) of FIG. 6 shows the locus of the second operational position which is the output of the second Kalman filtering unit 7A.

(1) of FIG. 7 shows the locus (without adjustment of operational coefficient) of the first operational position which is the output of the first Kalman filtering unit 5A when the operational coefficient is not adjusted. (2) of FIG. 7 shows the locus (with operational coefficient adjustment and without weight setting) of the first operational position when the operational coefficient is adjusted but the weight "α" is not set. (3) of FIG. 7 shows the locus (with operational coefficient adjustment and with weight setting) of the first operational position when both the adjustment of the operational coefficient and the setting of the weight "α" are performed.

First, from the locus of the GPS operational position shown in (2) of FIG. 6, it can be seen that the locus greatly meanders place to place and the position error is very large. This is because the operation accuracy of the GPS is lowered due to the influence of the multipath. From the locus of the second operational position shown in (3) of FIG. 6, it can be seen that a smooth locus is drawn in comparison with the locus of the GPS operational position, but is not a locus along the true locus shown in (1) of FIG. 6.

In the locus (without operational coefficient adjustment) of the first operational position shown in (1) of FIG. 7, a locus in which a bias is applied to the true locus is obtained in a dotted portion S1. By adding the adjustment of the operational coefficient according to this exemplary embodiment to this, the result shown in (2) of FIG. 7 is obtained. From the locus (with operational coefficient adjustment and without weight setting) of the first operational position shown in (2) of FIG. 7, it can be seen that the position calculation accuracy is improved by the adjustment of the operational coefficient. However, a position deviation from the true locus occurs in a dotted portion S2.

By adding the setting of the weight "$\alpha$" according to this exemplary embodiment to this, the result shown in (3) of FIG. 7 is obtained. From the locus (with operational coefficient adjustment and with weight setting) of the first operational position shown in (3) of FIG. 7, it can be seen that an accurate locus along the true locus shown in (1) of FIG. 6 is obtained. Particularly, the position calculation accuracy is improved in the portions corresponding to the dotted portion S1 in (1) of FIG. 7 and the dotted portion S2 in (2) of FIG. 7. From this experiment results, it was proved that the position calculating method according to this exemplary embodiment is effective.

3. Example

An example of an electronic apparatus including the position calculating device will be described below. Herein, an example of a car navigation apparatus including a position calculating device will be described. Here, the example of the invention is not limited to the following example.

3-1. System Configuration

Figure 8:
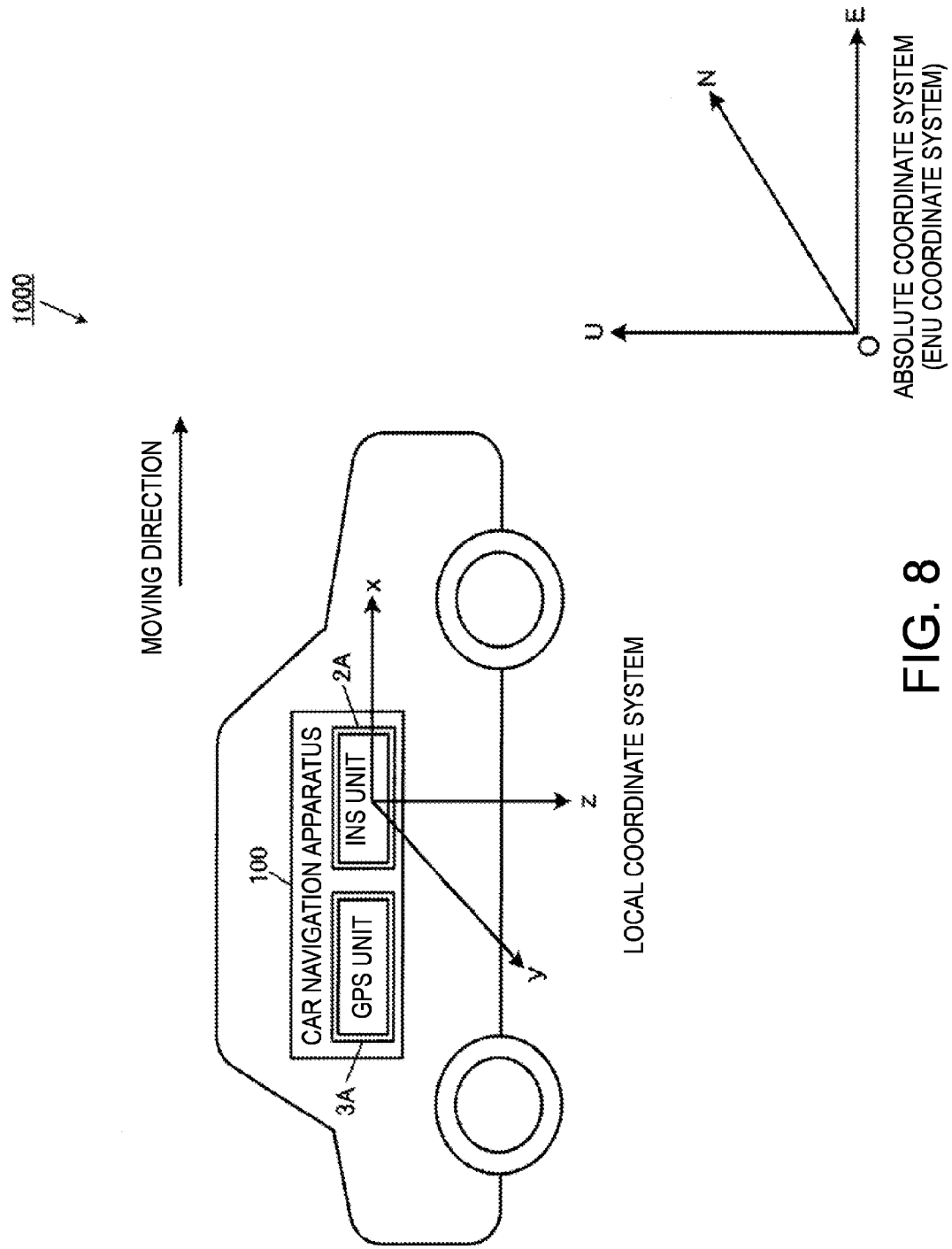
FIG. 8 is a diagram illustrating a system configuration of a navigation system.

FIG. 8 is a diagram illustrating a system configuration of a navigation system 1000 according to this example. In the navigation system 1000, a car navigation apparatus 100 including a position calculating device 1 is installed in a four-wheeled automobile (hereinafter, simply referred to as "automobile") which is a kind of moving object.

The car navigation apparatus 100 is an electronic apparatus that is installed in an automobile so as to provide a driver of the automobile with navigation guidance. The car navigation apparatus 100 includes an INS unit 2A and a GPS unit 3A.

The car navigation apparatus 100 calculates the position of the automobile using the INS operation result input from the INS unit 2A and the GPS operation result input from the GPS unit 3A in accordance with the position calculating method described in the principle. The car navigation apparatus creates a navigation screen in which the calculated position is plotted to display the screen on a display which is a display unit 30.

3-2. Functional Configuration

Figure 9:
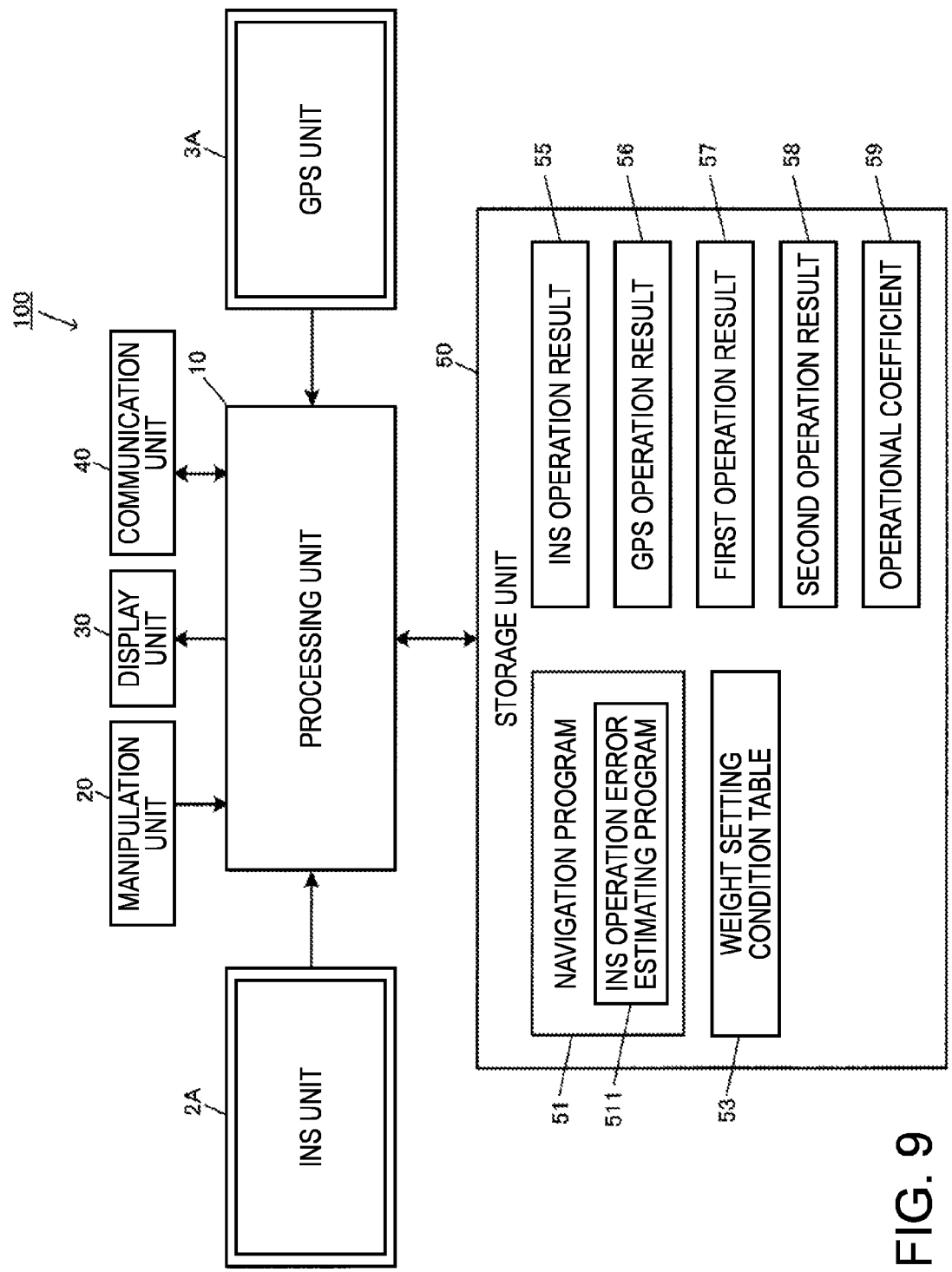
FIG. 9 is a block diagram illustrating a functional configuration of a car navigation apparatus.

FIG. 9 is a block diagram illustrating an example of a functional configuration of the car navigation apparatus 100. The car navigation apparatus 100 includes the INS unit 2A, the GPS unit 3A, a processing unit 10, a manipulation unit 20, a display unit 30, a communication unit 40, and a storage unit 50.

The processing unit 10 is a control device that comprehensively controls the units of the car navigation apparatus 100 in accordance with various programs such as a system program stored in the storage unit 50 and includes a processor such as a central processing unit (CPU). The processing unit 10 performs a navigation process in accordance with a navigation program 51 stored in the storage unit 50 and displays a map with a current position of an automobile marked thereon on the display unit 30.

The manipulation unit 20 is an input device including, for example, a touch panel or button switches, and outputs the signal of the pressed key or button to the processing unit 10. Various instruction inputs such as an input of a destination are performed by manipulating the manipulation unit 20.

The display unit 30 is a display device that includes a liquid crystal display (LCD) and that performs various displays based on a display signal input from the processing unit 10. The navigation screen or the like is displayed on the display unit 30.

The communication unit 40 is a communication device that transmits and receives information used in the apparatus to and from the outside through communication networks such as the Internet in accordance with the control of the processing unit 10. Known wireless communication techniques can be used in the communications.

The storage unit 50 is constructed by a storage device such as a read only memory (ROM), a flash ROM, and a random access memory (RAM), and stores a system program of the car navigation apparatus 100, various programs for realizing various functions such as a navigation function, data, and the like. The storage unit has a work area temporarily storing data in process of various processes and process results thereof.

In the storage unit 50, a navigation program 51 which is read by the processing unit 10 and which is executed as various navigation processes (see FIG. 10) is stored as the program. The navigation program 51 includes an INS operation error estimating program 511 which is executed as the INS operation error estimating process (see FIG. 11) as a sub routine.

The storage unit 50 stores as the data, for example, a weight setting condition table 53, an INS operation result 55, a GPS operation result 56, a first operation result 57, a second operation result 58, and an operational coefficient 59.

The weight setting condition table 53 is a table in which weight setting conditions as in the first weight setting condition table (see FIG. 4) or the second weight setting condition table (see FIG. 5) are determined.

3-3. Process Flow

Figure 10:
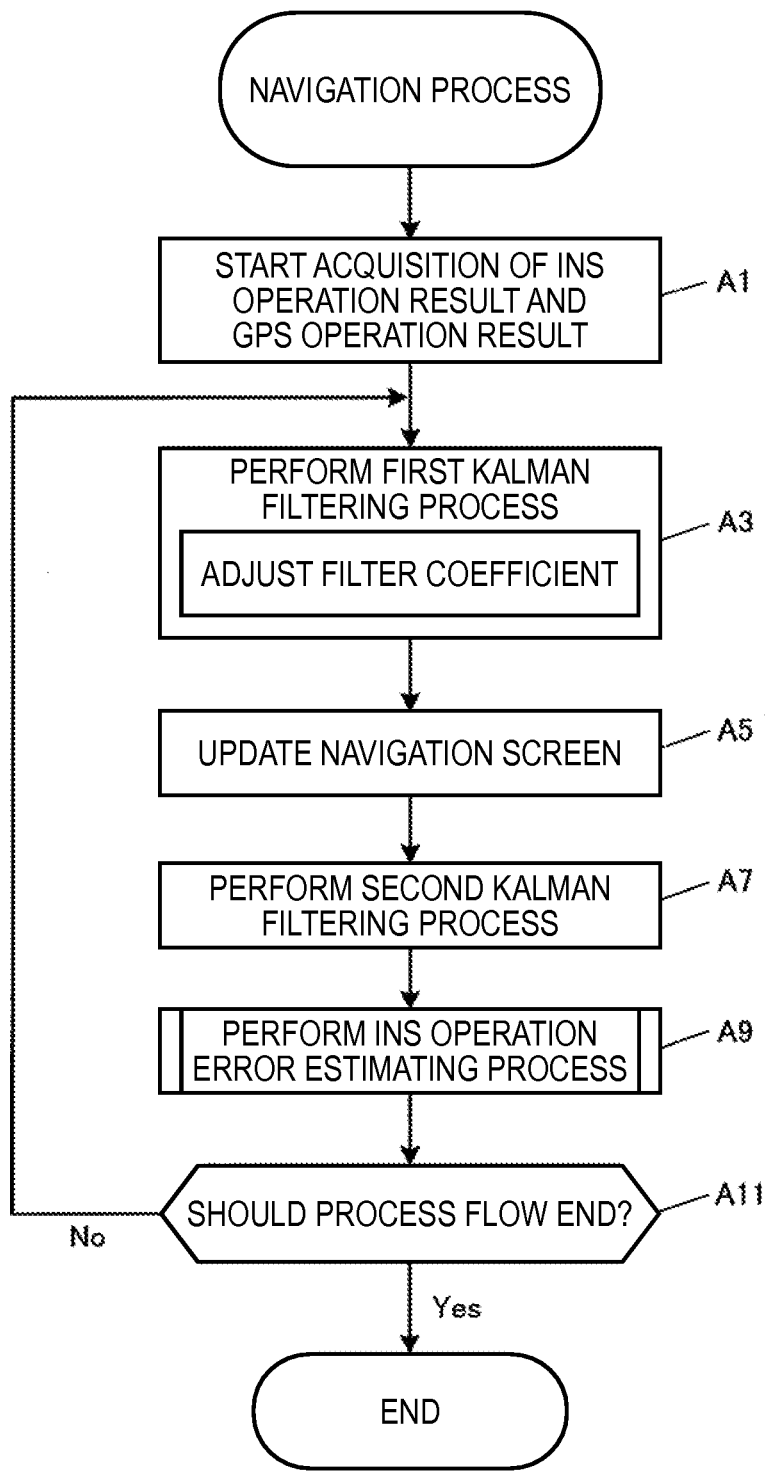
FIG. 10 is a flowchart illustrating the flow of a navigation process.

FIG. 10 is a flowchart illustrating a process flow of a navigation process which is performed in accordance with the navigation program 51 stored in the storage unit 50 by the processing unit 10.

First, the processing unit 10 starts acquisition of the INS operation result 55 and the GPS operation result 56 from the INS unit 2A and the GPS unit 3A, respectively (step A1). Then, the processing unit 10 performs the first Kalman filtering process (step A3).

In the first Kalman filtering process, the filter coefficient is adjusted using the estimation result of the previous INS operation error estimating process (step A9) and the operational coefficient 59 in the storage unit 50 is updated. Specifically, as described in the principle, the state "X" is adjusted using the estimated INS operation error, and the error covariance "P" is adjusted, for example, using Expressions 14 to 17. The Kalman filtering process is performed using the adjusted filter coefficient and the first operation result 57 in the storage unit 50 is updated with the operation result.

Subsequently, the processing unit 10 performs a map matching process or the like on the operational position calculated in the first Kalman filtering process and a navigation screen on the display unit 30 is updated with the result (step A5).

Thereafter, the processing unit 10 performs the second Kalman filtering process (step A7). The processing unit 10 updates the second operation result 58 in the storage unit 50 with the operation result of the second Kalman filtering process. Then, the processing unit 10 performs the INS operation error estimating process in accordance with the INS operation error estimating program 511 stored in the storage unit 50 (step A9).

Figure 11:
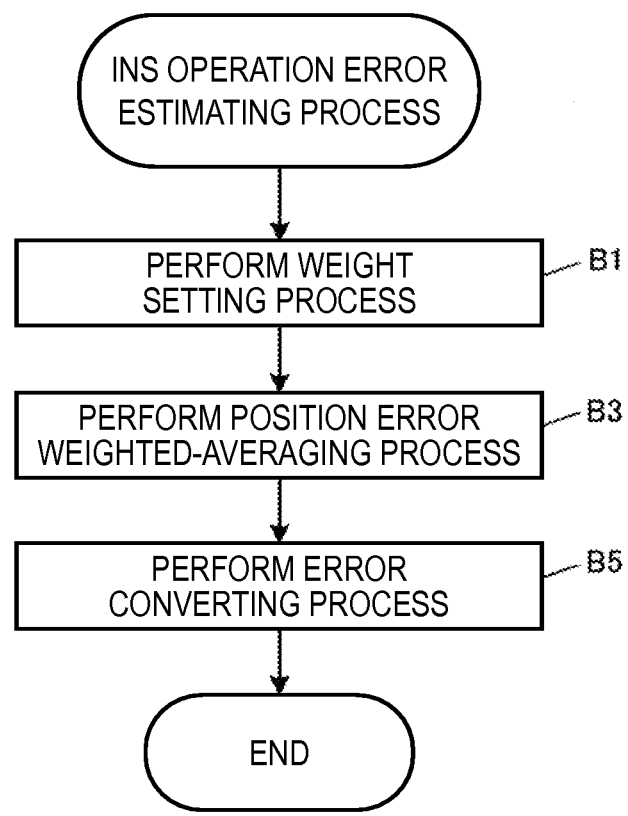
FIG. 11 is a flowchart illustrating the flow of an INS operation error estimating process.

FIG. 11 is a flowchart illustrating a process flow of the INS operation error estimating process.

First, the processing unit 10 performs the weight setting process (step B1). Specifically, the weight "α" is set using the method described in the principle with reference to the weight setting condition table 53 stored in the storage unit 50.

Subsequently, the processing unit 10 performs the position error weighted-averaging process (step B3). Specifically, the first operational position error "$P1_{err}$" calculated in the first Kalman filtering process and the second operational position error "$P2_{err}$" calculated in the second Kalman filtering process are weighted-averaged using the weight "α" set in step B1 and using Expression 7 to calculate the average position error "$aveP_{err}$".

Thereafter, the processing unit 10 performs an error transform process (step B5). Specifically, the average position error "$aveP_{err}$" calculated in step B3 is transformed to an INS operation error using Expressions 9 to 13. Then, the processing unit 10 ends the INS operation error estimating process.

Referring to the navigation process shown in FIG. 10 again, after performing the INS operation error estimating process, the processing unit 10 determines whether the process flow should end (step A11). For example, when a user instructs to end the navigation process through the use of the manipulation unit 20, it is determined that the navigation process should end.

When it is determined that the process flow should not end (NO in step A11), the processing unit 10 returns the process flow to step A3. When it is determined that the process flow should end (YES in step A11), the navigation process ends.

4. Operational Advantages

According to this exemplary embodiment, in the position calculating device 1, the first operational process of calculating at least the position of a moving object using the measurement result of the inertial positioning unit 2 disposed in the moving object is performed by the first operation processing unit 5. The second operational process of calculating the position of the moving object using the result of the first operational process and the measurement result of the satellite positioning unit 3 disposed in the moving object is performed by the second operation processing unit 7. The operational coefficient of the first operational process is adjusted using the result of the first operational process and the result of the second operational process by the operational coefficient adjusting unit 9.

For example, in the first position calculating device 1A employing the position calculating device 1, the first Kalman filtering unit 5A performs the Kalman filtering process using the operation result (INS operation result) of the INS unit as an input and using the operational velocity (GPS operational velocity) of the GPS unit 3A as an observable. The second Kalman filtering unit 7A performs the Kalman filtering process using the operation result (first operation result) of the first Kalman filtering unit 5A as an input and the operational position (GPS operational position) of the GPS unit 3A as an observable.

The addition and subtraction unit 8 calculates the difference between the INS operational position and the second operational position as the second operational position error. In the INS operation error estimating unit 91, the weight setting unit 913 sets the weight for weighted-averaging the first operational position error and the second operational position error. The first operational position error and the second operational position error are weighted-averaged by the position error weighted-averaging unit 911. The error converting unit 915 converts the average position error into the INS operation error using the average position error which is the result of the weighted-averaging and feeds back the conversion result to the first Kalman filtering unit 5A.

The weight setting unit 913 sets the weight of the weighted average, for example, depending on the first weight setting condition determined on the basis of the positioning environment or the second weight setting condition determined on the basis of the plural factors such as the reliability of the GPS operational position, the reliability of the GPS measurement information, the reliability of the second operational position, and the reliability of the time information. Accordingly, it is possible to appropriately adjust the weight of the weighted average and to appropriately estimate the error included in the INS operational position.

The error converting unit 915 performs a conversion operation using the Kalman filter using the error covariance input from the first Kalman filtering unit 5A and the average position error input from the position error weight-averaging unit 911 to estimate the INS operation error. By using the Kalman filter, it is possible to appropriately estimate the INS operation error from the average position error.

The filter coefficient calculating unit 93 calculates and adjusts the filter coefficient used in the first Kalman filtering process using the INS operation error estimated by the INS operation error estimating unit 91 and the Kalman gain. For example, the state (state vector) or the error covariance (error covariance matrix) used in the first Kalman filtering process is calculated and adjusted. By performing the first Kalman filtering process using the filter coefficient adjusted in this way, it is possible to calculate the position of the moving object with high accuracy.

5. Modification Example

Examples to which the invention can be applied are not limited to the above-mentioned examples, but can be appropriately modified without departing from the concept of the invention. In modification examples described below, the same elements as in the above-mentioned examples will be referenced by the same reference signs, description thereof will not be repeated, and differences from the above-mentioned examples will be mainly described.

5-1. Units

In the above-mentioned embodiment, the GPS unit 3A employing the GPS is exemplified as the satellite positioning unit 3, but units employing other satellite positioning systems such as WAAS (Wide Area Augmentation System), QZSS (Quasi Zenith Satellite System), GLONASS (GLObal NAvigation Satellite System), and GALILEO may be used.

In the above-mentioned embodiment, the INS unit 2A is exemplified as the inertial positioning unit 2, but an inertial sensor or an inertial measurement unit (IMU) measuring INS measurement information (acceleration or angular velocity) may be used as the inertial positioning unit 2. In this case, the first operation processing unit 5 may be configured to perform the first operational process using the INS measurement information measured by the inertial positioning unit 2 as an input U.

5-2. Operational Process

The operational processes performed by the first operation processing unit 5 and the second operation processing unit 7 are not limited to the Kalman filtering process. For example, a sigma point filtering process using a sigma point or a regression filtering process may be applied to the second operational process.

5-3. Coordinate System

In the above-mentioned embodiment, the INS unit 2A calculates the position, the velocity, and the posture angle of a moving object in the ENU coordinate system, but they may be calculated in the NED coordinate system or the ECEF coordinate system. The first operational process or the second operational process may be performed in the NED coordinate system or the ECEF coordinate system instead of the ENU coordinate system.

5-4. Weight Setting Condition

The weight setting conditions exemplified in the above-mentioned embodiment are only an example, and can be appropriately added/deleted. For example, a condition based on the reliability of the operation result of the INS unit 2A may be determined. When a large error is mixed into the measurement result of the inertial sensor (a gyro sensor or an acceleration sensor) of the INS unit 2A, the operation accuracy of the INS unit 2A is lowered. In this case, the operation accuracy of the first operational process using the INS operation result as an input is lowered.

As a result, the influence thereof markedly appears in the first operational position error "$P1_{err}$" calculated in the first operational process. Therefore, when the reliability of the operation result of the INS unit 2A is low, it is effective to set the weight "$\alpha$" of the first operational position error "$P1_{err}$" to be larger so as to emphasize the first operational position error "$P1_{err}$" to perform the weighted-averaging. In this case, "reliability of INS unit=low" has only to be set as the high weight setting condition.

In the above-mentioned embodiment, a method of setting the weight "$\alpha$" in combination of plural conditions "A, B, C, D, . . . " for the second weight setting condition has been described. However, the plural conditions "A, B, C, D, . . . " may be used alone to set the weight "$\alpha$".

5-5. Processing Entity

In the above-mentioned embodiment, the INS unit 2A performs the INS operation and the GPS unit 3A performs the GPS operation. However, the processing unit 10 of the electronic apparatus may perform the INS operation or the GPS operation.

In this case, the INS unit 2A outputs the INS measurement information (such as an acceleration or an angular velocity). The GPS unit 3A outputs the GPS measurement information (such as a code phase, a Doppler frequency, a pseudo-distance, and a pseudo-distance variation).

Then, the processing unit 10 of the electronic apparatus performs the INS operation using the INS measurement information input from the INS unit 2A and performs the GPS operation using the GPS measurement information input from the GPS unit 3A. Then, the processing unit 10 performs the first and second operational processes using the INS operation result and the GPS operation result.

5-6. Electronic Apparatus

The above-mentioned embodiment discloses an example where the invention is applied to a navigation apparatus mounted on a four-wheeled automobile, but the electronic apparatus to which the invention can be applied is not limited to the example. For example, the invention may be applied to a navigation apparatus mounted on a two-wheeled automobile or may be applied to a portable navigation apparatus.

The invention may be similarly applied to electronic apparatuses other than a navigation apparatus. For example, the invention may be similarly applied to other electronic apparatuses such as a mobile phone, a PC, and a personal digital assistant (PDA) to realize position calculation of the corresponding electronic apparatuses.

The invention claimed is:

1. A position calculating method comprising:
    performing a first operational process of calculating at least a position of a moving object using the measurement result of an inertial positioning unit disposed in the moving object;
    performing a second operational process of calculating the position of the moving object using the result of the first operational process and the measurement result of a satellite positioning unit disposed in the moving object; and
    adjusting an operational coefficient of the first operational process using the result of the first operational process and the result of the second operational process,
    wherein the measurement result of the inertial positioning unit includes an inertial positioning position,
    wherein the first operational process includes a predetermined error estimating operation of estimating a first position error included in a calculated first operational position,
    wherein the adjusting of the operational coefficient includes:
        estimating an inertial positioning error included in the inertial positioning position using the first position error and a second operational position calculated in the second operational process; and
        adjusting the operational coefficient using the inertial positioning error, and wherein the estimating of the inertial positioning error includes:
    calculating a difference between the inertial positioning position and the second operational position; and
    calculating the inertial positioning error by averaging the first position error and the difference.

2. The position calculating method according to claim 1, wherein the averaging process is a process of setting weights of the first position error and the difference on the basis of one or both of a positioning environment and reliability of the measurement result of the satellite positioning unit and performing a weighted averaging operation.

3. The position calculating method according to claim 1, wherein the measurement result of the inertial positioning unit includes an inertial positioning position, and
    wherein the first operational process is a Kalman filtering process using the inertial positioning position as an input.

4. The position calculating method according to claim 3, wherein the measurement result of the satellite positioning unit includes a velocity, and
    wherein the Kalman filtering process is a process using the velocity as an observable.

5. The position calculating method according to claim 1, wherein the measurement result of the satellite positioning unit includes a satellite positioning position, and
    wherein the second operational process is a Kalman filtering process using the result of the first operational process as an input and using the satellite positioning position as an observable.

6. A position calculating device comprising:
- a first operation processing unit that performs a first operational process of calculating at least a position of a moving object using the measurement result of an inertial positioning unit disposed in the moving object;
- a second operation processing unit that performs a second operational process of calculating the position of the moving object using the result of the first operational process and the measurement result of a satellite positioning unit disposed in the moving object; and
- an adjustment unit that adjusts an operational coefficient of the first operational process using the result of the first operational process and the result of the second operational process,
- wherein the measurement result of the inertial positioning unit includes an inertial positioning position,
- wherein the first operational process includes a predetermined error estimating operation of estimating a first position error included in a calculated first operational position,
- wherein adjusting of the operational coefficient includes:
    - estimating an inertial positioning error included in the inertial positioning position using the first position error and a second operational position calculated in the second operational process; and
    - adjusting the operational coefficient using the inertial positioning error, and wherein the estimating of the inertial positioning error includes:
    - calculating a difference between the inertial positioning position and the second operational position; and
    - calculating the inertial positioning error by averaging the first position error and the difference.

* * * * *